United States Patent [19]
Blair et al.

[11] Patent Number: 5,239,463
[45] Date of Patent: Aug. 24, 1993

[54] METHOD AND APPARATUS FOR PLAYER INTERACTION WITH ANIMATED CHARACTERS AND OBJECTS

[76] Inventors: Preston E. Blair, 3465 Crestline Way, Soquel, Calif. 95073; Frank S. Preston, 413 Hempstead Rd., Williamsburg, Va. 23188

[21] Appl. No.: 804,320

[22] Filed: Dec. 9, 1991

Related U.S. Application Data

[60] Division of Ser. No. 442,230, Nov. 28, 1989, which is a continuation-in-part of Ser. No. 228,946, Aug. 4, 1988, abandoned.

[51] Int. Cl.[5] ............................................. G06F 15/44
[52] U.S. Cl. .................................... 364/410; 352/87; 273/433
[58] Field of Search ................. 364/410; 273/433, 440; 352/87, 50, 51; 434/307, 317, 335; 340/709, 729

[56] References Cited

U.S. PATENT DOCUMENTS 4,711,543  11/1989  Blair ........................................ 352/87

Primary Examiner—Gail O. Hayes
Attorney, Agent, or Firm—Davis & Schroeder

[57] ABSTRACT

An improved video system that enables a player to interact with mid-air stereo perception images of foreshortened perspective animation and return the animation back to the playing field on the projection screen or monitor, or to effect other interactive dramatics with the animation. The improvements include placing an ultrasonic transducer on the player's body for allowing the player's position to be calculated and providing the player with a pair of glasses that improve 3-D viewing of the animation. The animation reacts according to the movement of an instrument such as a baseball bat, a tennis racket or a rifle controlled by the player, as well as to the speed and direction of the player's body movement. The relative positions of the player's body, the instrument and the animation are tracked with an array of point microphones that receive signals from the ultrasonic transducers.

7 Claims, 11 Drawing Sheets

METHOD AND APPARATUS FOR PLAYER INTERACTION WITH ANIMATED CHARACTERS AND OBJECTS

CROSS REFERENCE TO RELATED APPLICATION

This application is a divisional application of U.S. Pat. Ser. No. 07/442,230, filed Nov. 28, 1989 which is a continuation-in-part of application Ser. No. 07/228,946, filed Aug. 4, 1988, now abandoned.

BACKGROUND OF THE INVENTION

The present invention relates generally to interactive video systems and to improvements in U.S. Pat. Nos. 4,695,953 and 4,711,543 entitled TV Animation Interactively Controlled by the Viewer. More particularly, the present invention relates to a method and apparatus wherein a viewer dynamically interacts with an animated video presentation to control action sequences and enable rapid and repeated switching of multiple tracks of recorded data representing different actions while retaining a continuous action sequence, and enable branching at the termination of an action sequence by effecting track rewind.

U.S. Pat. No. 4,695,953 teaches a double-circuit video system that in one embodiment enables a player to repeatedly touch or hit an animated character during a continuous action scene as displayed on a projection screen or video monitor and thus change the action repeatedly. Another embodiment enables a player to swing a racket before the screen or video monitor, hit the mid-air projected image of a perspective ball animated action, return the ball back to the animated character opponent, and play a simulated game during which the player exercises the same skills used to play the game simulated. An ultrasonic transducer in a playing instrument and a microphone combination disposed on the video monitor face or at angles to the playing action permits the calculation of a signal representing the monitor contact position or the mid-air position of the playing instrument action relating to the game. The signal thus calculated is compared to a similar representation of the position of the character or object in the associated frame of the animation displayed by the video monitor and digitally coded on tape or disc.

U.S. Pat. No. 4,711,543 teaches a method of animation to provide smooth animation displayed on the video monitor of a continuous action scene during rapid and repeated switching of multiple tracks of data representing different animation action sequences.

While the interactive video systems disclosed by the above-cited U.S. patents admirably fulfills the roles of educational and amusement systems, it is a primary objective of the present invention to extend the capabilities and effectiveness of such systems.

SUMMARY OF THE INVENTION

The present invention provides an improvement of the interactive video system disclosed in U.S. Pat. Nos. 4,695,953 and 4,711,543. The improvement comprises the addition of a player ultrasonic transducer to a system that includes a combination of one or more instrument ultrasonic transducers positioned on a playing instrument such as a rifle, a baseball bat, a catcher's mit or a tennis racket, and an array of one or more microphones. The player ultrasonic transducer is positioned on the body of a player who controls the instrument.

The instrument and player ultrasonic transducers transmit signals of different pulse width and frequency thereby providing a method for distinguishing between signals transmitted by an instrument transducer and a player transducer.

The microphone array is positioned so as to permit a calculation of the positions and speed of the instrument and player relative to an animated image projected from a video monitor or a television screen, thereby providing superior interaction between the player and the animated graphics than was possible with the prior art. Electronic circuitry permits such calculated positions to be compared to coded animation positions thereby permitting interaction between the player and the animation displayed on the video monitor. Typically interaction with the animation is achieved by switching and rewinding to multiple tape or disk positions multiple tracks of recorded animation during continuous action or game scenes displayed on the television screen or video monitor.

Means for enhancing the visual perception of the projected animated image are also described. In the preferred embodiment, two pictures in alternating fields of a video signal are transmitted and a pair of glasses worn by the player controls which picture is seen by the player at a particular point in time.

BRIEF DESCRIPTION OF THE DRAWING

The invention will be more fully comprehended from the following detailed description and accompanying drawing in which.

DETAILED DESCRIPTION OF THE PREFERRED EMBODIMENT

Figure 1:
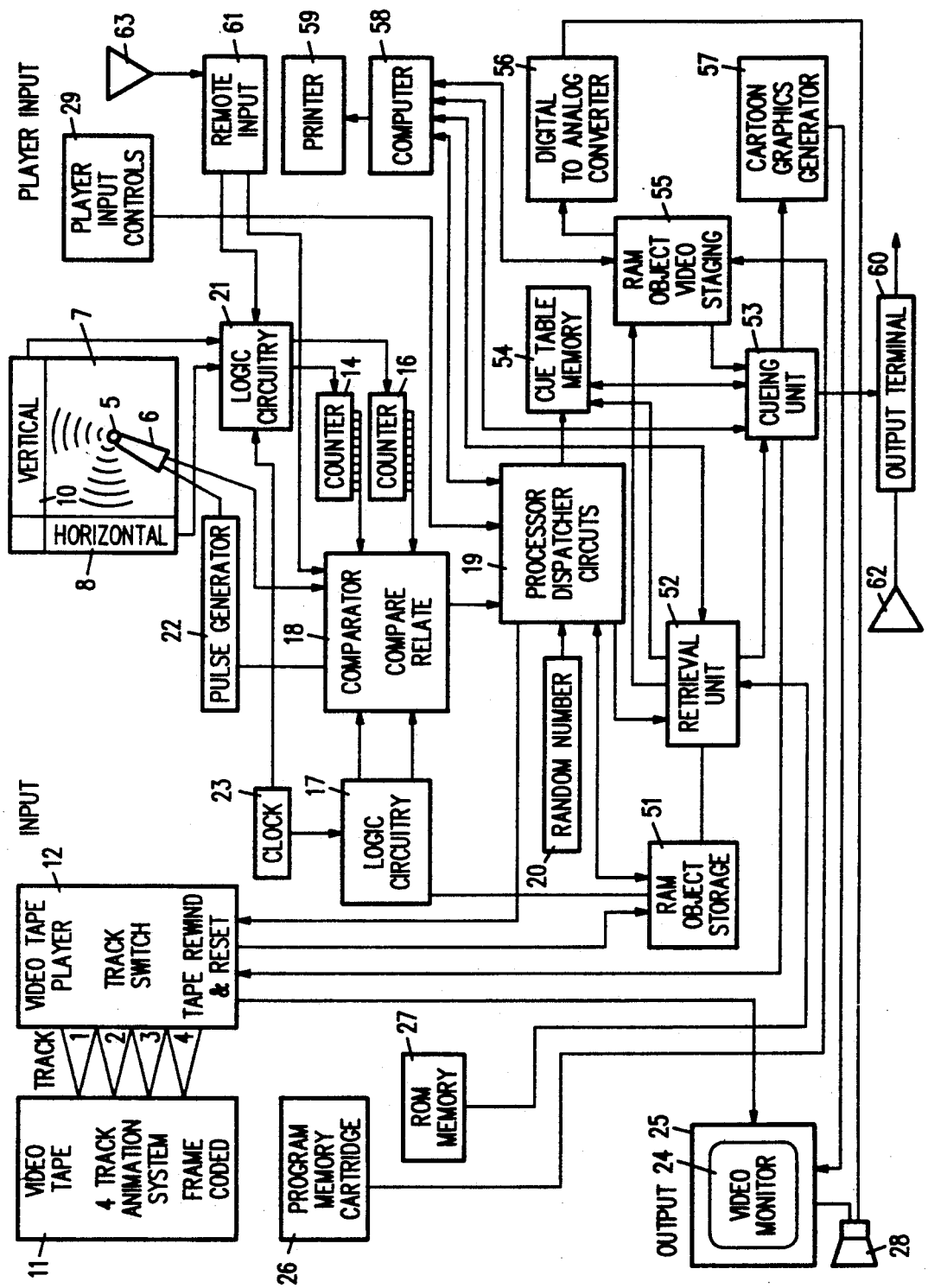
FIG. 1 is a schematic block diagram showing one embodiment of the present invention using a video-tape and a video-tape reader for the primary circuit and a secondary circuit of digitally produced animation which may be used for scoring and diagram scenes.

Referring to FIG. 1, there is shown a block diagram of the invention educational and amusement video system as a combination of two different types of videogame circuits. The details and functions of the circuits shown in FIG. 1 are more fully described in U.S. Pat. Nos. 4,695,953 and 4,711,543 hereby incorporated by reference as if fully set forth herein. The primary circuit provides operational control of the system and incorporates camera-originated motion pictures with audio as supplied in this embodiment by video tape 11 and video tape player 12. A secondary circuit incorporates digitally produced or stored animation, a user controlled computer 58, a printer 59 and a multi-function output terminal 60.

Referring to FIG. 1, two strip microphones 8 and 10 are responsive to the ultrasonic pulses produced by instrument 6. These microphones, in conjunction with clock 23, counters 14 and 16, and logic circuitry 21, measure the time delay for airborne propagation between the radiation of a pulse at instrument 6 and its arrival at the respective microphones 8 and 10. Logic circuitry 21 combines the outputs from microphones 8 and 10, pulse generator 22 and clock 23 to control counters 14 and 16 which count or measure the time delays. The measured time delays establish the coordinates of the location of contact tip 5 on the surface of book page 7 shown in FIG. 1 at the time of any particular pulse output. The application of this known ultrasonic method to detecting locations that are compared to coded animation locations to effect the course of animation is unique and unknown.

The animator's field positions of the graphics displayed on book page 7 shown in FIG. 1 is entered by the animator on specific frames of the production exposure sheet that instructs the exposure of those drawings that detail graphic positions to be contacted by instrument 6. Such locations per frame are converted to digital binary coordinates. The motion picture frames are counted, specified, and used to enter a table of values holding these graphic positions and vital data on the tape or disc at the beginning of each page episode of the animation. All of these numbers are stored in the circuit RAM 51 of FIG. 1 and retrieved when applicable to the animation display. The frame number is recorded at intervals on the video tape track 11 and used as a track guide. Special track coding allows fast rewinds to specific frames located from track signals. Referring to FIG. 1, the coded field positions with frame numbers are stored by player 12 from tape or disc 11 into RAM 51 at the beginning of each page episode. This table of values in RAM 51 supplies pertinent data to logic circuitry 17 on time to be compared to the coordinates of the pen 6 transducer tip 5 as it contacts the surface of book page 7.

The comparator circuit 18 of FIG. 1 compares the two field coordinates derived from the digital readouts of counters 14 and 16 to the two coordinates of the field and page 7 shown in FIG. 1 location of graphics locations from logic circuitry 17 and RAM 51. The comparator 18 instructs the processor circuit 19 if specific field coordinates coincide. Based on this data an order is dispatched to the system primary or secondary circuit to provide specific animation. If such order is dispatched by processor 19 to the primary circuit, the order is dispatched to video tape player 12 which switches between a plurality of tracks, indicated in this embodiment as 1, 2, 3 and 4, based on the program of the episode and track instructions from program memory cartridge 26, RAM 55, and cueing (cuing) unit 53. Or, the video tape player 12 may rewind to a position in the tracks based on said program. If such order is dispatched to the secondary circuit, the processor 19 dispatches an order to cueing unit 53 via cue table memory 54.

Referring to FIG. 1, the secondary circuit animation and graphics is generated by cartoon graphics generator 57 from digital data which may be read along with digital audio from ROM memory 27 or other mass-storage device. Retrieval unit 52 is a conventional peripheral input reader-controller which transfers into memory the digitally coded blocks of information obtained from ROM memory 27. This information includes control data which retrieval unit 52 stores into random access memory (RAM) 51 for use by dispatcher unit 19, and audio and/or graphics data which unit 52 stores into RAM 55 for use by cueing unit 53. The control data includes cue commands and schedule commands. Cue commands specify short term operation during an interval of time, while schedule commands represent longer term points of time, and form chains which define and relate to alternate (multiple track) schedule. Dispatcher 19 controls the course of the animation or graphics display, audio, and stores cue commands into cue table 54. Cueing unit 53 executes the cue commands. Cueing unit 53 repeatedly scans cue table 54 to get commands telling it what to do and the time it should be done. Dispatcher unit 19 may request successive blocks of control information from retrieval unit 52 and output into cue table memory 54 a schedule (called a cue table) of operations for cueing unit 53. Dispatcher 19 repeatedly updates the cue table schedule as the animation progresses. Dispatcher 19 processes the various optional player input controls 29 which may input via conventional video game playing instruments and stores the different player commands into cue table 54.

As described, dispatcher 19 controls the course of the animation and stores cue commands into cue table 54. Cueing unit 53 executes the cue commands at the times specified therein by conveying to the cartoon graphics generator circuit 57 blocks of binary-coded data previously stored into RAM 55 by retrieval unit 52, and these blocks of data are used by the cartoon graphics generator 57 to generate animation frames which are then displayed on television monitor 25. Digital audio passes from ROM memory 27 through retrieval unit 52 to memory 55 to digital to analog converter 56 and hence to system speaker 28. The binary coded data stored into RAM 55 is reinforced by individual page or game data supplied by program memory cartridge 26.

The primary multiple track video tape animation circuit, which is diagrammed in FIG. 1, is operated and scheduled by the processor dispatcher 19 which has control of the course of the camera-originated animation. The comparator 18 furnishes the results of the player's action to the processor 19 which instructs the switching of multiple tracks 1, 2, 3, and 4 with game or sequence position to video tape player 12. At the termination of a game or sequence either random number generator 20, player input 29, or the placement of instrument 6 on page book 7 specifies an episode to processor 19 which instructs tape player 12 of the rewind.

The operation of both the primary and secondary animation circuits is controlled by processor 19 based on data from program memory 26 and ROM memory 27 and the operation of the secondary circuit retrieval, cueing, and memory circuits as described above. As ordered by processor 19, this instruction is sent to tape player 12 or cartoon graphics generator 57 by cueing unit 53. The digital memory cartridge 26 can be various types of memory and may be plugged in to change the scenario, provide digital data for each book page 7, or to replace video/audio means 11 and 12 and supply the coded animation used by the system.

Figure 2:
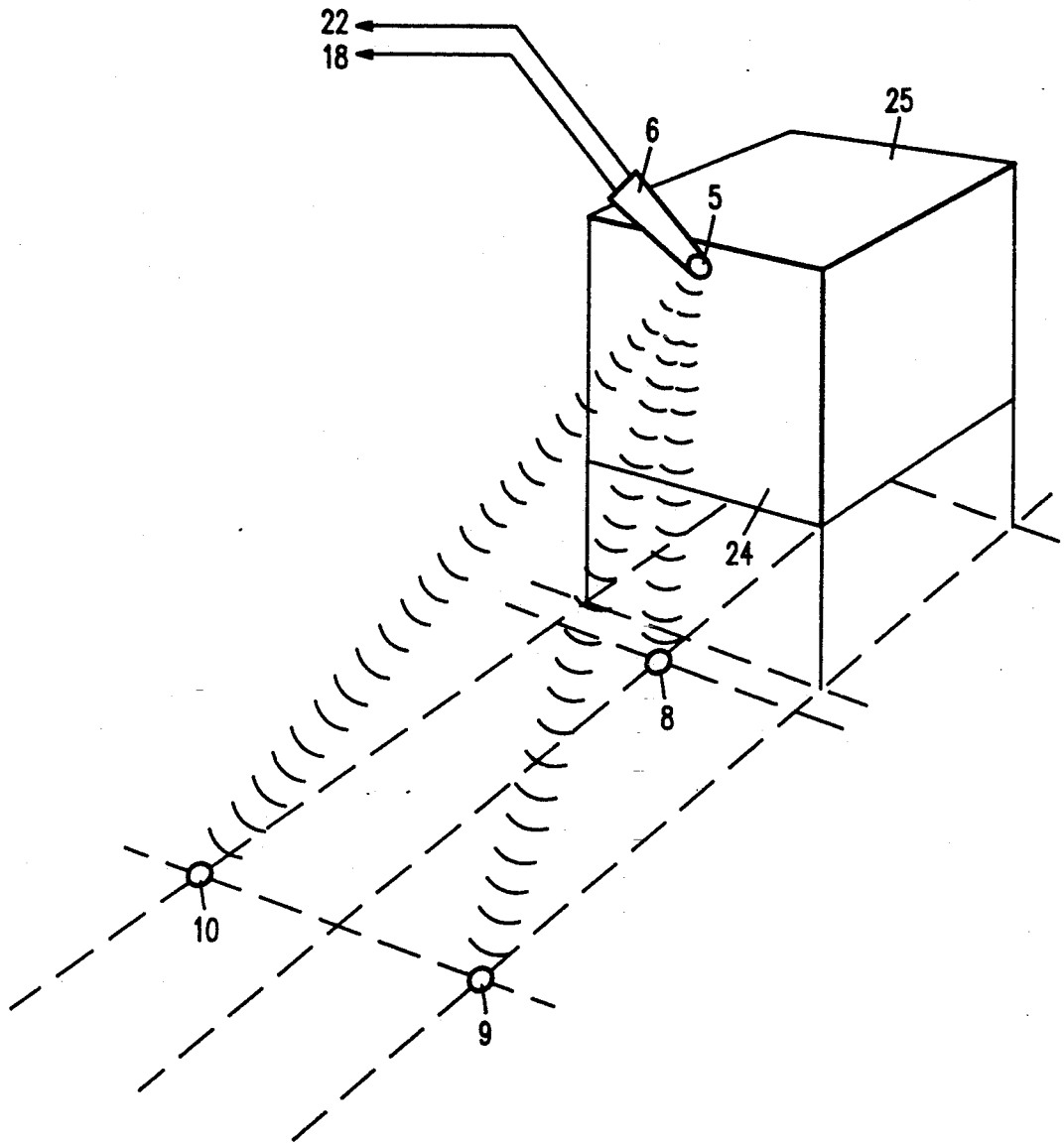
FIG. 2 is a diagram in perspective showing the placement of discrete point microphones in a triangular array with a transducer incorporated in a hand-held indicating pen about a 3-dimensional study object illustrating another embodiment of the present invention.

Referring now also to FIG. 2, an alternate embodiment in accordance with the present invention utilizes a 3-dimensional solid object which may be any form of mechanism or sculpture and is shown as cube 25. One or more arrays comprising three point or discrete microphones 8, 9 and 10 are positioned at angles around said solid object study 25 sufficient to encompass the surface area and enable a student to study any point on the object 25 as described in the above book embodiment. For example, the study object 25 may represent a globe of the earth with the 3-dimensional coordinates of selected points or the globe associated with animated video display and sound tracks providing information concerning the country or region surrounding the selected point. An alternate embodiment provides for rotation of the study object 25 to registered fixed positions, thereby requiring only one array of three discrete microphones as shown in FIG. 2. Each fixed stop position for the study object has a separate table of location values defined. FIG. 2 illustrates an installation of single discrete point microphones 8, 9, and 10 before side 24 of object 25. The student indicates the point on the study object 25 to be studied with indicator 6 as the point indicator pen 6 tip 5 touches the side of object 24.

Figure 3:
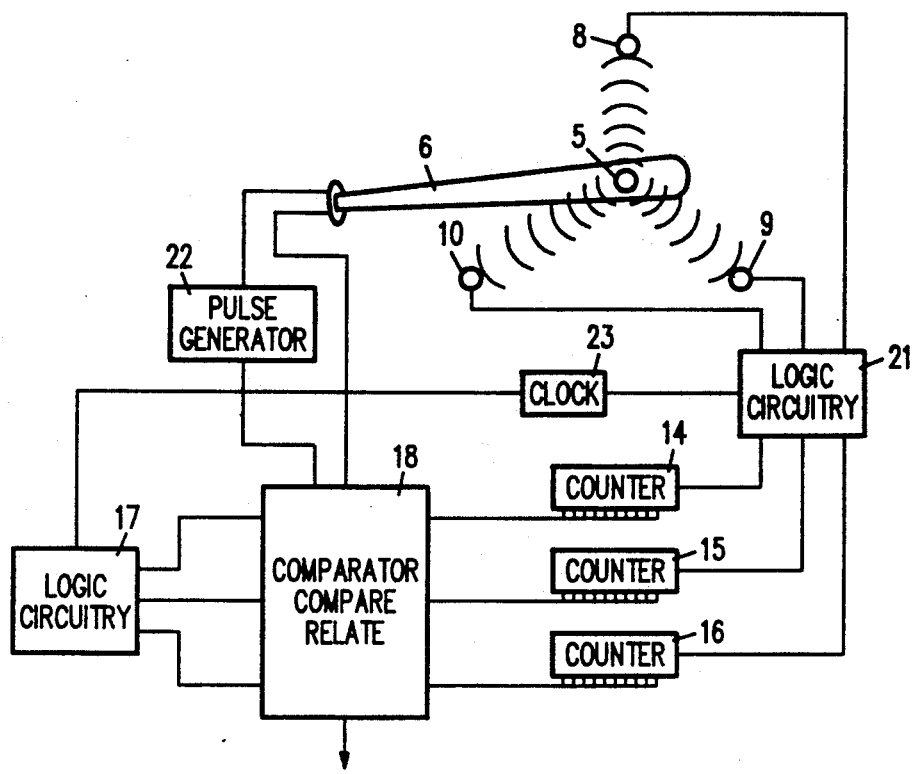
FIG. 3 is a functional block diagram of an alternative circuit of FIG. 1 implementing the system shown in FIG. 2.

Referring now also to FIG. 3, a functional block diagram shows circuitry which replaces the similar circuits and apparatus of FIG. 1. Using the three triangular formation variable measurements of microphone 10 to 8, 5 to 9, and 5 to 10, 3-dimensional location coordinates of the points on object 25 touched by indicator instrument 6 are determined and interactively related to the animation displayed on the monitor 25. A keyboard module comprising the player input control section 29 (as shown in FIG. 1) is used by the student to select the category of animation response. The uses include training and simulation systems. The solid objects studied may be machinery, motor vehicles, globe maps, weaponry, medical physiology models, taxidermy, instruments, tools, farm equipment, and the interior circuitry of electronic devices as televisions and computers. The animation may display a cross-section of the interior action of such studies as a human heart or automobile carburetor. Multiple objects may be studied as a plurality of mounted, connected, or associated objects. The student may repeatedly review animated instruction according to his own comprehension development. The embodiment creates another dimension of multiple animated action analysis for the classroom, sales display, vocational training, or any other form of studied object education. An alternate embodiment of indicating instrument 6 would be a glove with a transducer 5 installed at the index finger tip and may use portable module circuitry, crystal-timed with a power source.

Referring now again to FIG. 1, the system shown includes computer 58 coupled to printer 59. The computer 58 is coupled to the host system via the host processor 19, the retrieval unit 52, the cuing unit 53 and RAM 55. The computer 58 receives and processes commands and other information and provides system commands to the host processor and system output to the printer 59 and to the system output terminal 60 via he cuing unit 53. The computer 58 also responds to user inputs via the player input control block 29 and the host processor 19. Printer 59 produces graphics or typing according to the contact of the pen transducer 6 to the printed computer or typewriter keyboards described in the above book embodiment. Many types, sizes, configurations, and colors of keyboards printed in the said book may operate the computer 58 and printer 59 when the keyboards are touched by said pen 6. Or, printed type describing computer functions may activate the function described of the computer when the type is touched by said pen 6.

Computer programs controlled by simple descriptive keyboards or graphics as described may be operated by a layman without any knowledge of a computer operational language such as MS DOS. Accordingly, the invention allows the beginner or layman to do everything a computer user needs to do without getting into the technical aspects of computer operation. Computer program software is incorporated in the book keyboard embodiment process allowing the layman to concentrate on computer function concepts presented by multiple types of keyboards as described. The layman may use a plurality of keyboards during a single computer function. Other functions of the computer may operate using graphic symbols as a keyboard. Flow charts may serve as computer keyboards. Thus the invention simplifies using a computer by enabling the layman to operate a computer without using the standard keyboard and computer program software directly. But, the layman does use the standard keyboard and the various accessory program software indirectly.

Further, multiple tracks of animation may elaborate and explain said printed keyboards to the layman in every detail that the layman indicates in said book with said pen. Such animated response would be separated from the above described computer response.

Figure 4:
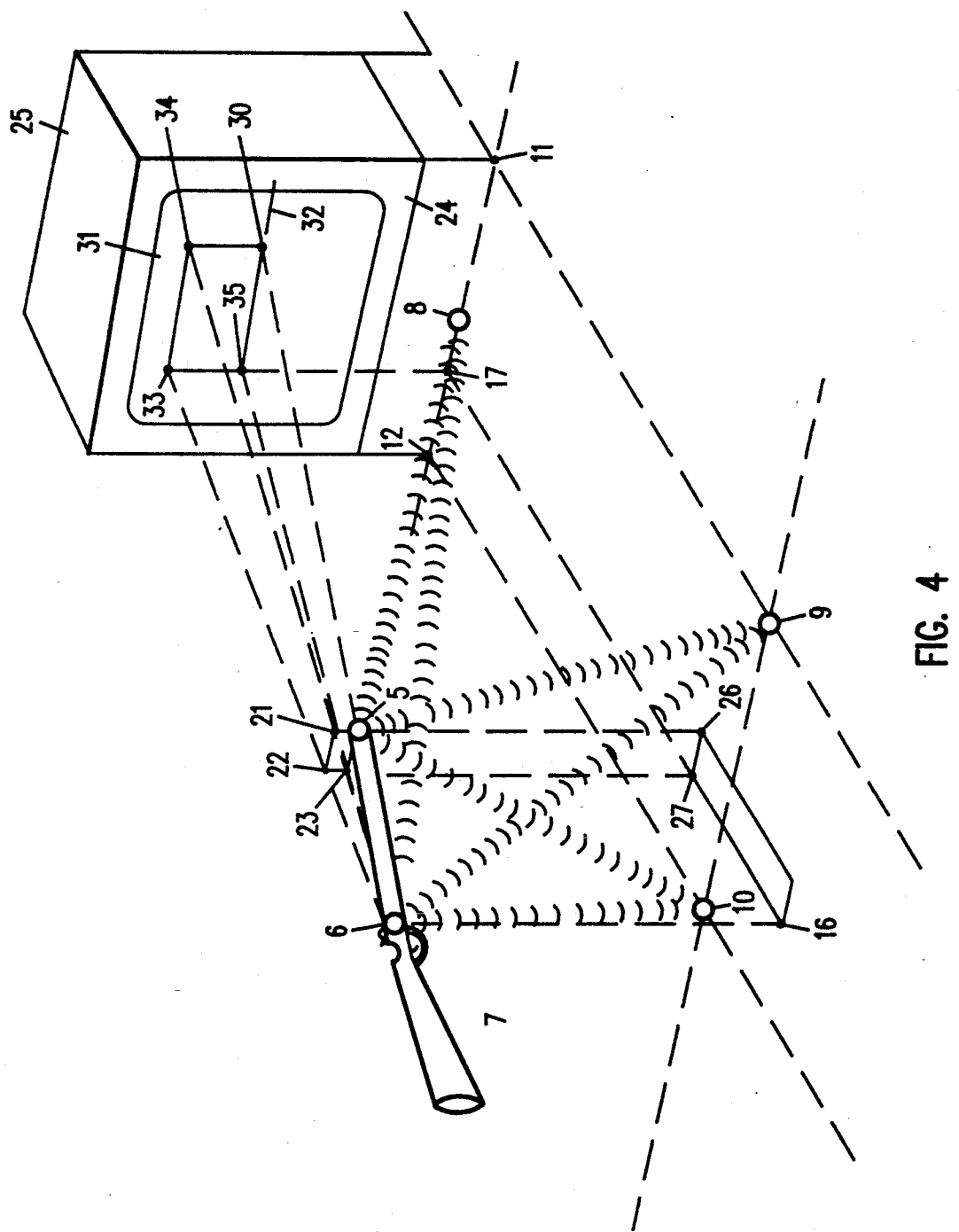
FIG. 4 is a diagram in perspective showing the placement of discrete point microphones in a pyramid array with sonic transducers installed in a rifle simulation before a video monitor illustrating another embodiment of the present invention.

Referring to FIG. 4, there is shown a drawing of a simulated rifle aimed at the face of a video monitor 24, or at a motion picture projection screen. When the rifle is aimed and triggered the invention calculates the precise point on the video monitor 24, or projection screen, whereto the rifle barrel 6 to 5 is aimed. Accordingly, the rifle embodiment is unique by instantly producing the coordinates of the point of aim on the screen. The usual firing of a missile, emission of light rays, or the manipulation of video monitor circuitry to effect a sliding cursor into the target all become extraneous and not intrinsic to the simulation process. Thus the gun embodiment may be used on large projection screens and incorporate large weaponry. The use of large projection screens also heightens the sense of reality by enlarging the target area. Transducers 6 and 5 working with point microphones 8, 9, and 10 permit the accurate determination of position and aiming direction of the rifle 7 relative to the screen 24. The calculation of the aiming spot may be done using various systems. The rifle may be aimed at specific points on the screen in the set-up mode to implement the initial condition measurements. Using rectangular coordinates, the positions may be calculated by ratios. As an example, Distance 33 - 31 is equal to Distance 22 - 21 multiplied by the ratio of Distance 6 - 33 to Distance 6 - 22. The various ratios may be organized to use only the directly measured values converted into their vertical and horizontal components. If the rifle 7 is fixed relative to the screen, these ratios may be fixed and the computation simplified by storing the pre-calculated fixed terms. (Calculation can avoid division and use faster multiplication if instead of dividing by some number, its reciprocal is calculated, stored, and used as a multiplier).

In this manner, all the other required distances to locate the aiming spot on the screen 24 can be calculated. Accordingly, there are improved elegant methods that use less computer power that are an advance of the simple geometric method as follows: Ultrasonic transducers 6 and 5 are installed at the extremities of the rifle barrel at the sighing position 6 and at the point of the rifle barrel 5. These transducers alternatingly emit impulses to the point microphones 8, 9, and 10 which are installed at equal distances from the base points 11 and 12 of monitor 25 on lines at right angles to said base line 11-12 and at the center of base line 11-12. A readout of said impulses by microphones 8, 9, 10 establishes the coordinates of transducers 6 and 5. The vertical elevation line of transducer 6 to floor point 16 is calculated for length and position of floor point 16. The length of line 16-17, intersecting base line 11-12 at right angles, is calculated to obtain the length of comparable parallel line 6 to 33. The vertical elevation line of transducer 5 to floor point 26 is calculated for length and position of floor point 26. The vertical difference of point 6 to point 5 establishes point 21. The distance from transducer 5 vertical line base 26 to transducer 6 vertical elevation line base 16 to 17 line is calculated to obtain comparable parallel distance 5 to 23. The distance of 6 to 21 is calculated from the right angle triangle 6-5-21 using the known measurements of 6 to 5 and 5 to 21. The known distance 6 to 21 is, then, used with the known distance 21 to 22 in the right angle triangle 6-21-22 to establish the distance of 6 to 22. The distance of 6 to 33 is divided by the distance of 6 to 22, and the resulting divisor is multiplied by the distance 21 to 22 to establish the distance 33 to 31. The said divisor is, then, multiplied by the distance of 22 to 23 to establish the distance of 33 to 35. The point on the video monitor screen 24, or projection screen, at which the rifle 7 is aimed is established by a vertical measurement of the known 33 to 35 distance to point 30, and the horizontal measurement of the known 33 to 31 distance to point 30. Said aimed "hit" position 30 is then compared to the target position of the animated object or character displayed by the video monitor 25 and digitally coded in the video tape or disc. The course of the animation is then changed according to the accuracy of the rifleman. The animation, if "hit", reacts with sound during continuous action. Other animation embodiments may include target scoring, instruction, or game graphics. The rifle simulation effect is enhanced by mechanical spring or electronic means causing the rifle to "kick" on being triggered to a degree simulating reality.

Figure 5:
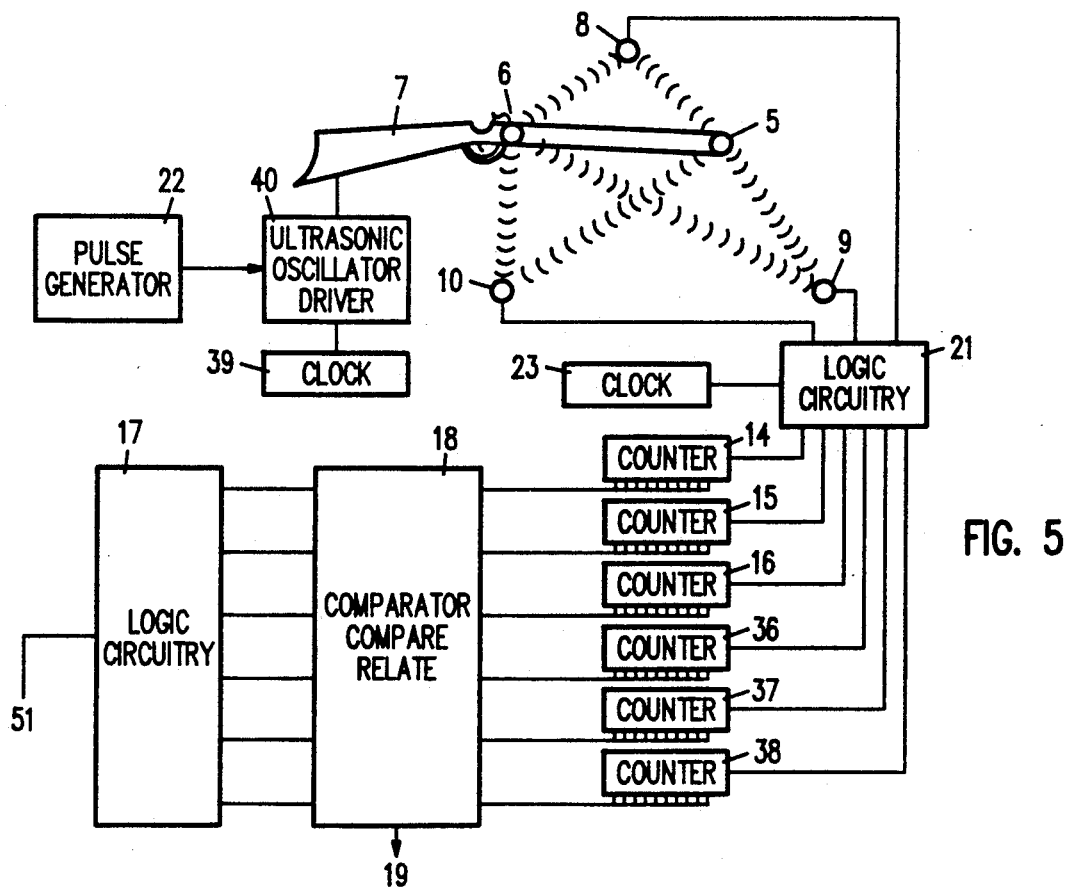
FIG. 5 is a functional block diagram of an alternate circuit of FIG. 1 implementing the system shown in FIG. 4.

Referring now also to FIG. 5, a functional block diagram of the rifle embodiment circuit which may be incorporated in the system double circuit of FIG. 1 is shown. The rifle 7 is a portable battery operated ultrasonic generator module. The generator module includes ultrasonic transducers 5 and 6 for emitting ultrasonic pulses. The transducers are driven by an ultrasonic oscillator keyed to produce pulses of ultrasonic energy at a fixed repetitive rate. A crystal controlled time base synchronizes the frequency, pulse width, and repetitive rate of the pulses. Transducers 5 and 6 each produce a pulse signal differing in pulse width and frequency. Accordingly rifle module 7 produces alternating pulses of two different types, one type emitted by transducer 5, and another type emitted by transducer 6. Point microphones 8, 9, and 10 detect the ultrasonic energy emitted by generator module rifle 7. Logic circuitry 21 recognizes the designation of each alternating type pulse by the pulse width and frequency. Accordingly, logic circuitry 21 divides the three pulses of the microphones 8, 9, and 10 to become six pulse signals to measure the three coordinates for each transducer 5 and 6. Counters 14, 15, 16, 36, 37, 38 convert the pulse data to digital form to be compared by comparator 18 to digitally coded animation location data.

A stereo visual perception embodiment of the present invention extends the scope and effectiveness of the invention and embodiments thereof described hereinabove and in the referenced U.S. patents related to animation interactively controlled by the viewer. Although foreshortened perspective animation admirably projects an image to a mid-air position before the monitor or projection screen, and although the speed of such projection renders such projected images undiscernible in animation, as they are in reality, a hundred miles per hour for a baseball pitcher's serve, a stereo visual perception process embodiment of the present invention provides slow moving objects and permanent three dimension projections before the screen to appear to the operator, or player, as reality, and thus heighten the simulation illusion. The preferred current three dimension (3-D) image scheme uses two pictures sent in alternating fields of a video (TV) signal. The viewer, or player, uses a pair of glasses with electric crystal "shutters" that allows only one eye to see at a time. The regular video (TV) picture is sent at 60 frames a second with alternating frames showing alternating lines (interlaced). Thus a half of the picture is sent in 1/60th of a second and complete pictures at 1/30th a second. By going to a higher signal bandwidth, the 3-D system sends one picture for one eye with no interlace in 1/60th of a second and both eyes see a complete 3-D picture 30 times a second.

Figure 11:
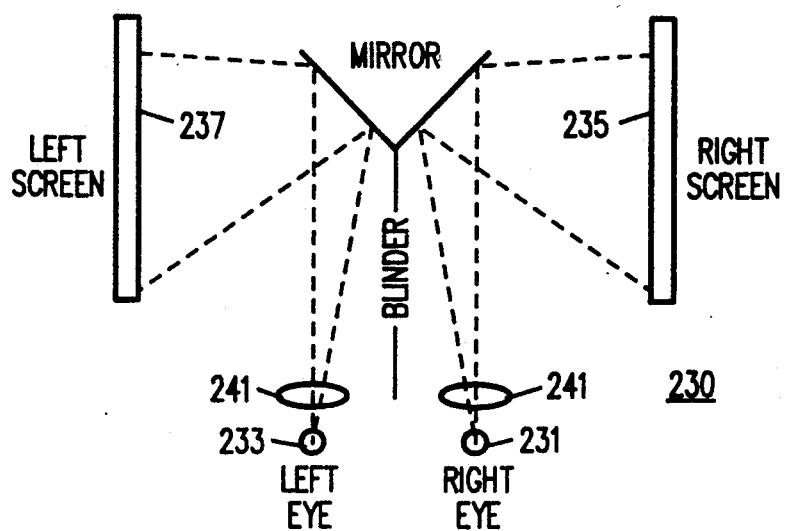
FIG. 11 diagrams a mirror and lens system to display pictures in three dimensions.
Figure 12:
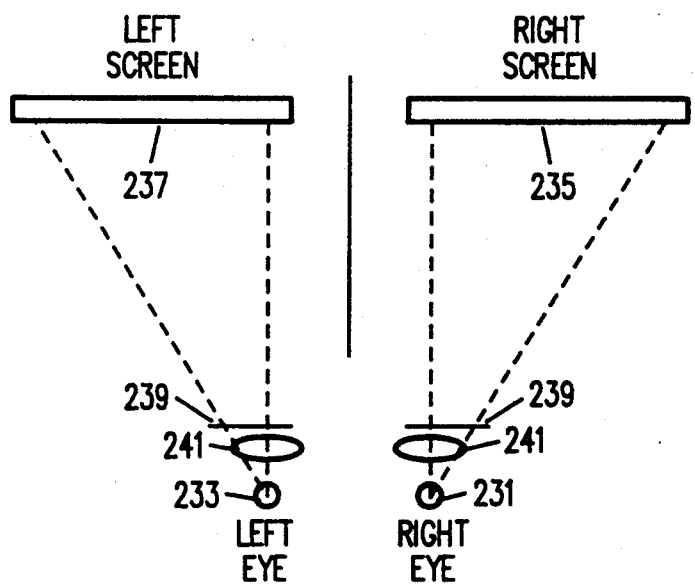
FIG. 12 diagrams an equivalent to system diagrammed in FIG. 11.

There are many ways to display and view three-dimensional video. FIG. 11 shows a mirror and lens system 230 arranged to give separate views for each eye 231, 233. If properly adjusted with visual images 235, 237 for each eye 231, 233, respectively, that are different perspective, the human brain believes the scene shown in the images is three-dimensional. The equivalent apparatus arrangement is shown in FIG. 12. The images 235, 237 can be taken with a camera that is shifted to the eye positions in an arrangement like FIG. 12 or the images can be computed or drawn by the animator. FIG. 12 works with filters 239 as shown with the optical paths including separate lenses 241 separated for the two eyes 231, 233. If the left eye image 237 is green and the left filter green while the right eye image 235 and filter for the right eye 231 are red, the two images 235, 237 can be projected overlapped on the screen and yet seen separately.

Figure 13:
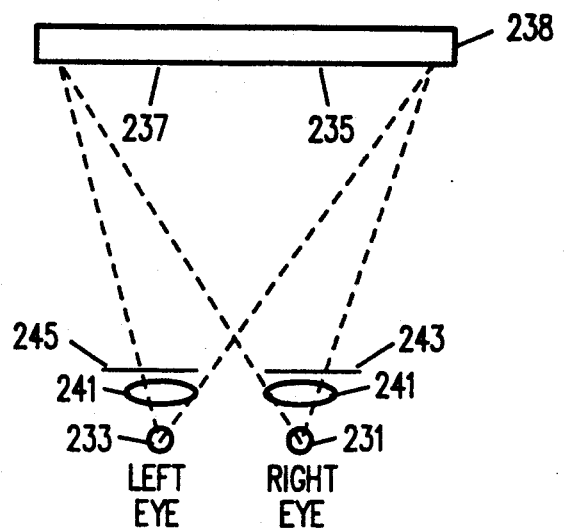
FIG. 13 diagrams a three dimension viewing system using overlapping images.
Figure 14:
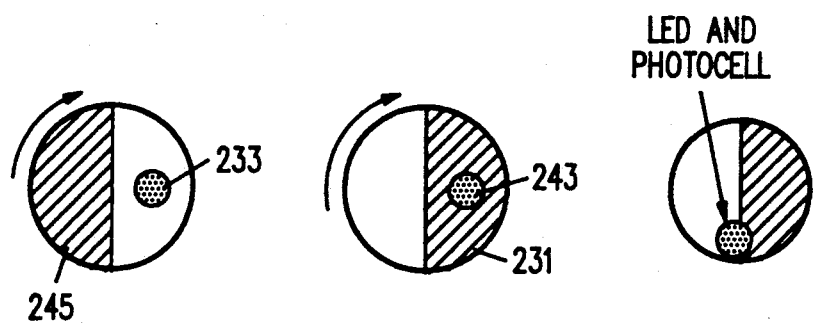
FIG. 14 diagrams rotating shutters used in system diagrammed in FIG. 13.
Figure 15:
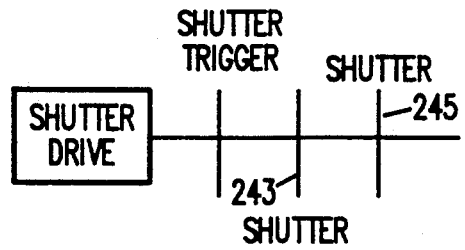
FIG. 15 shows a system to drive said shutters and generate a trigger signal to control the projection of left and right images.

The above arrangement can be used as shown in FIG. 13 with the right and left images 235, 237 overlapped on screen 238 provided that some method is used to allow only one eye 231, 233 at a time to see the overlapped image. For example, two rotating shutters 243, 245 as shown in FIG. 14 rotating at 24 or 30 times a second alternately allow one eye 231, 233, respectively, to view the overlapped image 235, 237 at a time (The shutters could have two opaque and two transparent segments each and be rotated at half speed). FIG. 15 shows a conceptual diagram of a system to drive the shutters 245, 243 and generate a trigger signal to control the projection of left and right images 237, 235. Two projectors can be used with shutters, one for each eye image. The trigger then can be used to keep the eye shutters properly synchronized.

Figure 16:
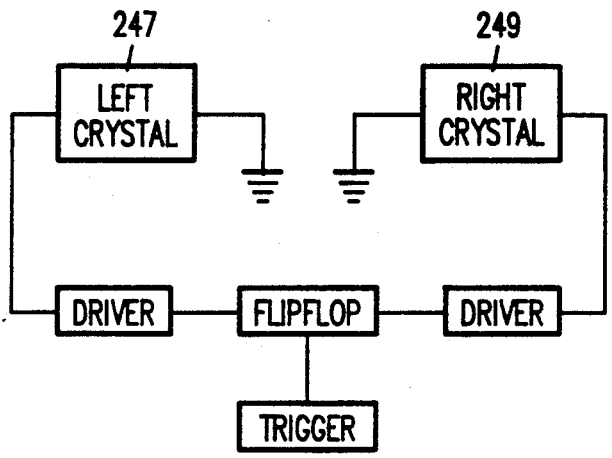
FIG. 16 is a conceptual block diagram illustrating an optical arrangement eliminating moving parts which employs crystals that can be made opaque or transparent.

Moving parts can be eliminated by optical arrangements employing crystals that can be made opaque or transparent based on an applied electrical signal. An alternate method could employ a crystal that changes (rotates) the plane of polarization based on an applied voltage. When a crystal of this type is used in combination with a polarizing filter, the light path can be open or blocked. FIG. 16 shows a conceptual block diagram for a circuit to control voltage-controlled crystal 247, 249 characteristics.

Figure 17:
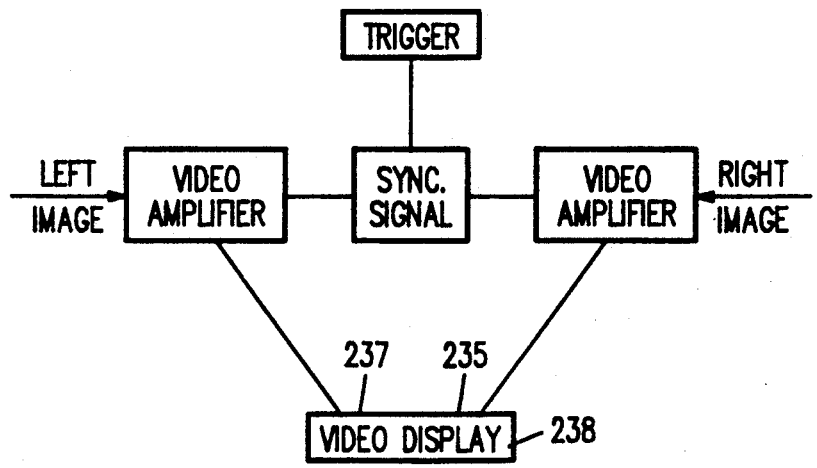
FIG. 17 is a functional block diagram illustrating a system to generate the visual images of the system shown in FIG. 13.

The un-energized system is configured with the polarized and crystal polarization at some angle, 45 or 90 degrees, for example, to each other. When a voltage signal is applied to the crystal, the polarization of the crystal is rotated to align with the polarization of the polarizer which allows light to pass through. The images 235, 237 can also be polarized to provide additional control of light paths. FIG. 17 shows a conceptual block diagram of a system to generate the visual images 235, 237 displayed on screen 238 as shown in FIG. 13.

Figure 6:
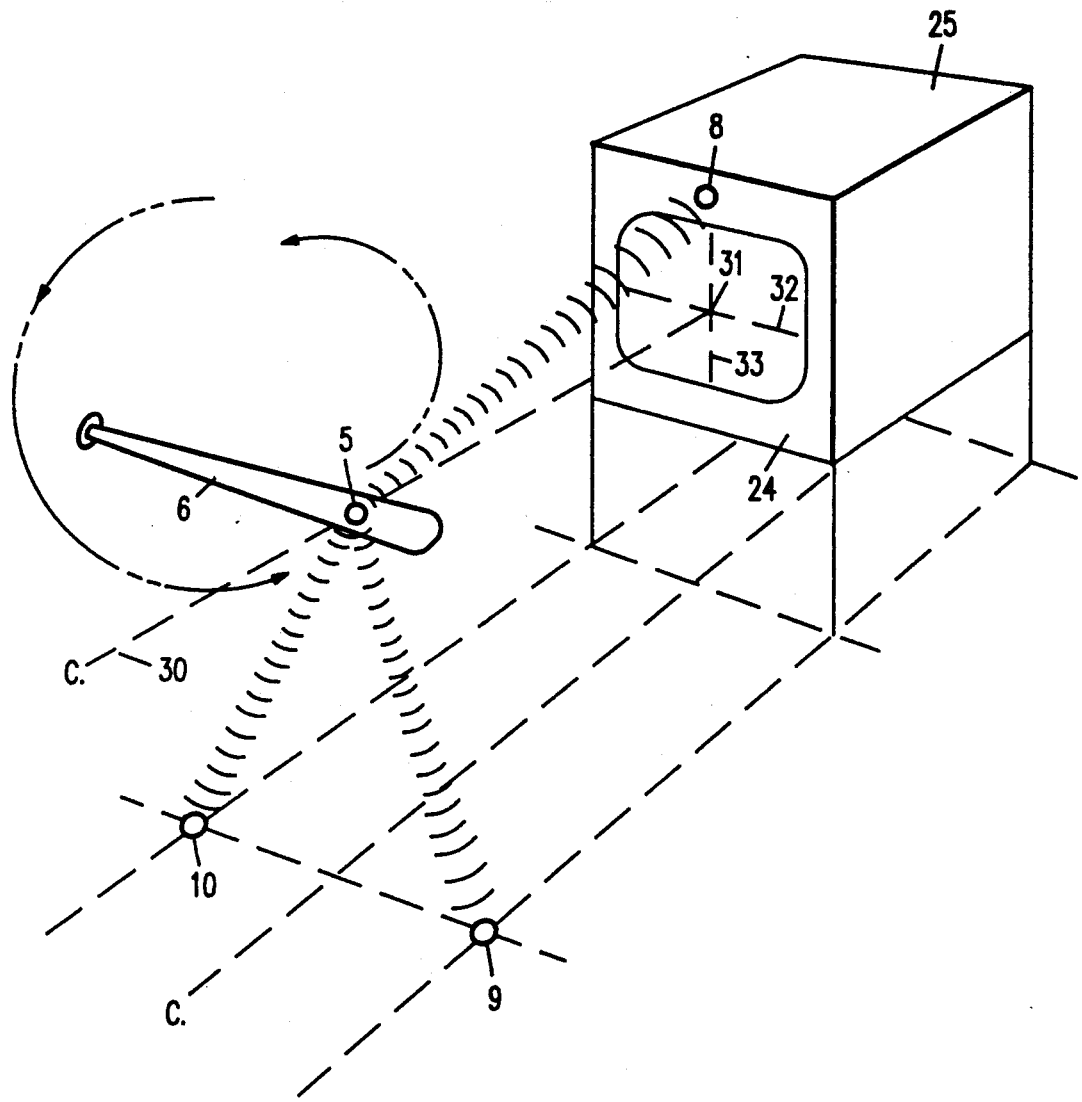
FIG. 6 is a diagram in perspective showing the placement of discrete point microphones in a pyramid array with a playing instrument incorporating a sonic transducer before a video monitor illustrating another embodiment of the present invention.

Referring to FIGS. 3 and 6 an embodiment of ultrasonic position detection incorporating 3-D stereo visual perception is shown. A transducer 5 is installed in a baseball bat 6, as shown, or in the socket of a catcher's glove. Three point microphones installed at points 8, 9, and 10 together with transducer 5 create pulse readouts measured as shown in FIGS. 3 and 6 that establishes the mid-air position of transducer 5, and this position is interactively related to the 3-D animation mid air position of, in this case, a baseball pitch. The player may also see and catch a slow moving thrown ball using a catcher's glove with transducer 5 installed. The catch is registered by the system when the animation ball position compares to the glove transducer 5 mid-air position. Mechanical or electronic means create an agitation in the socket of the glove to simulate reality with the system sound effects. Another system embodiment enables the player to swing a racket before the screen or video monitor, hit the mid-air stereo visual 3-D projected image of a perspective ball animated action, return the ball back to the animated character opponent in stereo 3-D perspective action, and play a simulated game exercising the same skills as the game simulated. Such games as tennis, ping-pong, badminton are thus played on animated stereo 3-D courts that change stereo 3-D perspectives as the action progresses from side to side of the court. Multiple stereo 3-D embodiments include the rifle described.

The process of producing animation provides means to provide two images of animated scenes calculated for each eye to create a stereo perception illusion of art work that is of only two dimensions. The cel animation may be photographed on the animation camera in two positions that widen as the foreshortened perspective action approaches the viewer. The right eye sees a cel drawing adjusted on the moving top or bottom pegs of the animation camera to a position toward the left, while the left eye sees another positioning of the same cel drawing 10 adjusted on the pegs to a position toward the right. And, two different animation drawings may be animated, in another means, to create different perspectives for each eye. Of course, such a process requires double the amount of animation drawings. Another means to create a stereo perception illusion is in the background art. The animation camera incorporates multiple moving top and bottom pegs. These pegs carrying sections of backgrounds may move at different speeds (spacing) according to the depth of perspective for each level. A tree in the background foreground would move on wider moves per frame than a grove of trees in the background distance. This movement is also augmented by slightly different peg positions of the tree and grove for each eye. If the animation camera is moved up or down from the compound art work, the resulting truck in or back is reinforced by separating or joining background levels, as trees, foreground objects on the sides of the scene, and these moves may also be calculated for each eye.

We have discovered embodiments extending the scope and effectiveness of the inventions and embodiments thereof described hereinabove and in the referenced U.S. patents by improving and advancing interactive dramatics between the player and the animated characters and graphics. The improved reactions of the animated characters and objects are based on the player's actions, speed of the player's actions and positions of the player and playing instrument, all obtained by transducer/microphone readouts.

Figure 7:
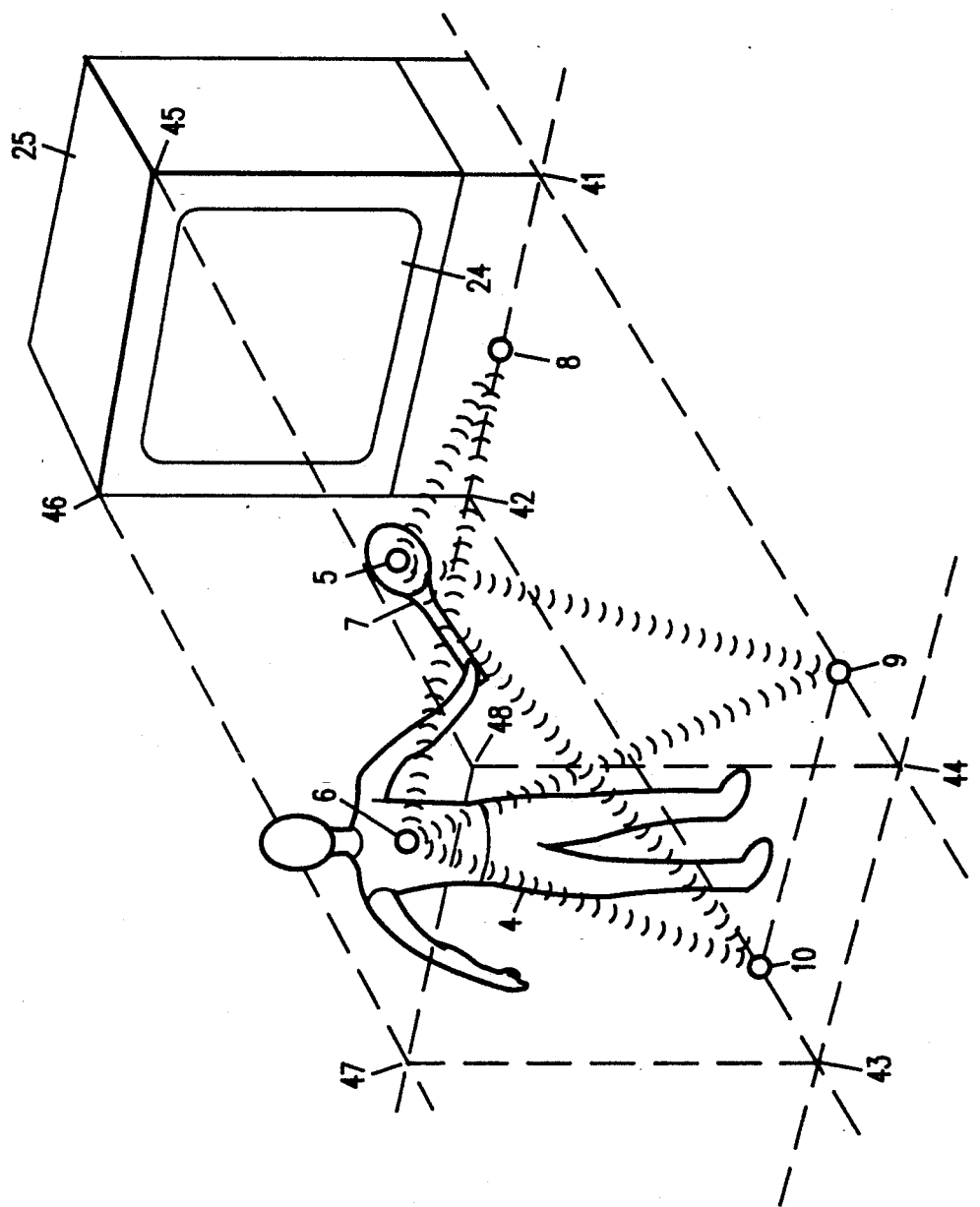
FIG. 7 is a diagram in perspective showing the placement of discrete point microphones in a triangular array with a player and playing instrument having transducers mounted thereon before a video monitor illustrating another embodiment of the present invention.
Figure 8:
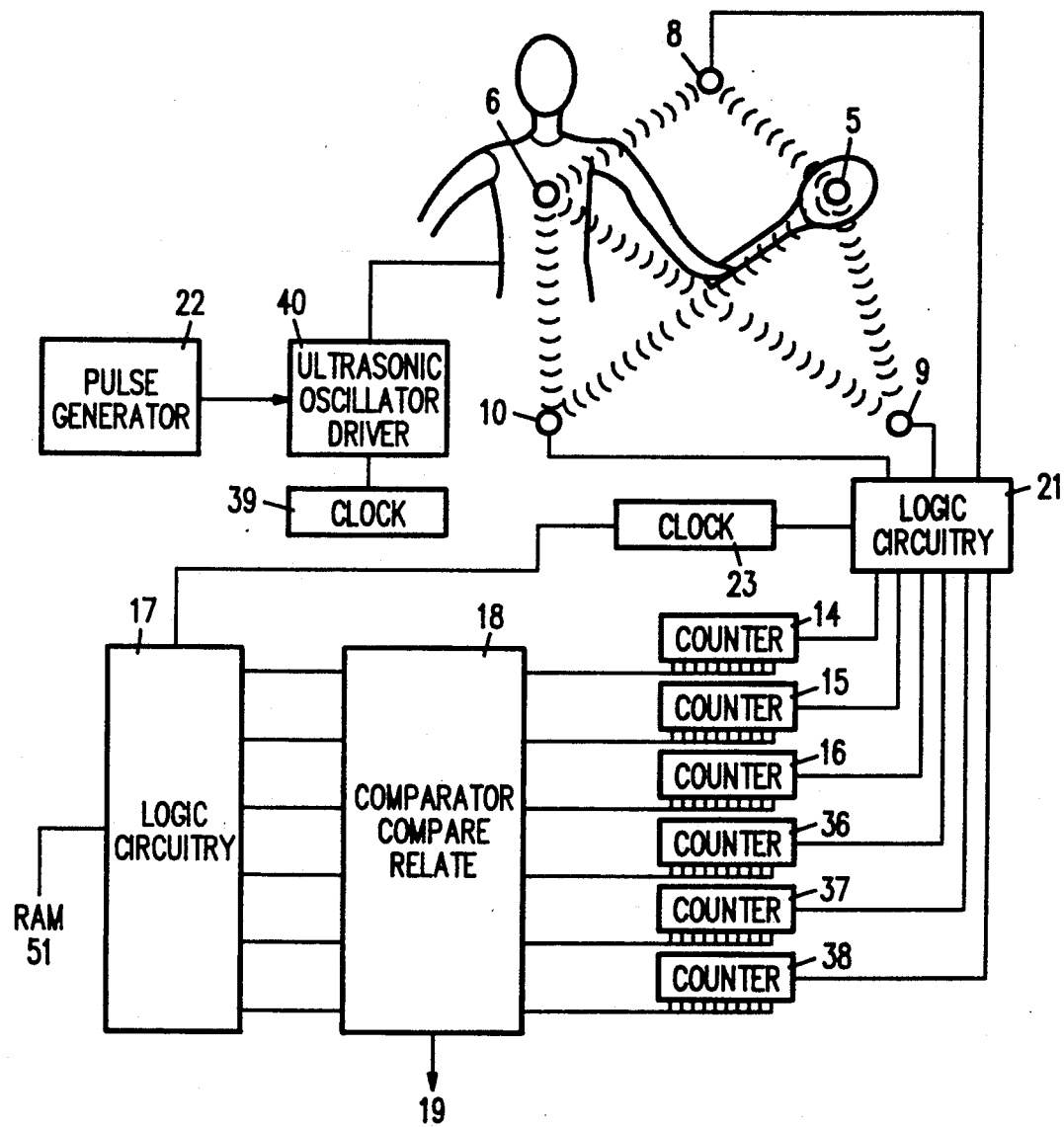
FIG. 8 is a functional block diagram of an alternate circuit of FIG. 1 implementing the system shown in FIG. 9.

Referring now to FIGS. 7 and 8, a system and associated circuitry for improved interactive dramatics between a player and displayed animated action sequences is shown. In FIG. 7 a transducer 6 is mounted on the body of player 4 and a transducer 5 is mounted in a glove or playing instrument 7. The player moves in an area whose base on the floor is located by the corners at positions 41-42-43-44 before video monitor 25. Transducers 5 and 6 working with an array of discrete point microphones 8,9 and 10 provide accurate determination of the three coordinates of the mid-air position of player transducer 6 and playing instrument transducer 5. As shown in FIG. 8 a portable battery operated module that is mounted on the player 4 includes a pulse generator 22 and an ultrasonic oscillator 40 keyed to produce pulses of ultrasonic energy at a fixed repetitive rate. A crystal controlled time base 39 (synchronized with time base 23) synchronizes the frequency, pulse width, and repetitive rate of the pulses. Transducers 5 and 6 each produce a pulse signal differing in pulse width and frequency. Accordingly the portable module produces alternating pulses of two different types, one type emitted by transducer 5, and another type emitted by transducer 6. Discrete point microphones 8, 9, and 10 detect the ultrasonic energy emitted by transducers 5 and 6. Logic circuitry 21 recognizes the designation of each alternating type pulse by the pulse width and frequency. Accordingly, logic circuitry 21 divides the pulse signals from the microphones 8, 9, and 10 to become six pulse signals to measure the three coordinates for each transducer 5 and 6 positions. Counters, 14, 15, 16, 36, 37, 38 convert the pulse data to digital form to be compared by comparator 18 to digitally coded animation location data corresponding to the animated display on the monitor 25 at a (time) frame.

The means of measuring the speed of the player transducer 6 and the playing instrument transducer 5 is based on measuring the velocity of the transducers 5, 6 relative to the receiving microphones 8, 9 and 10.

Figure 9:
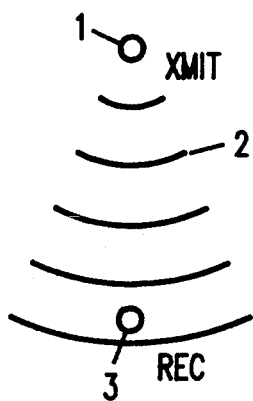
FIG. 9 is a conceptual diagram of the transmission of pulse waves to a single-point receiver by an ultrasonic transponder.
Figure 10:
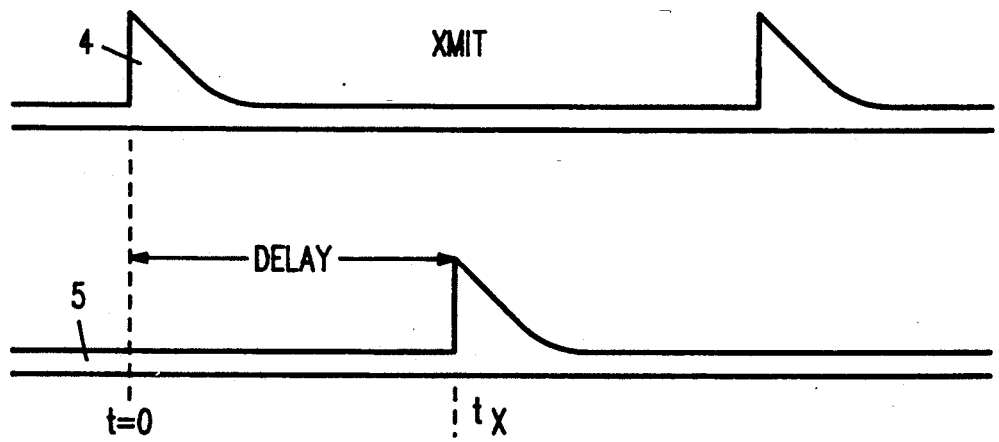
FIG. 10 is a timing diagram of ultrasonic pulses transmitted and received.

Various well-known means of ultrasonic measurement may be used according to the game needs, distances, and vector geometry. FIG. 9 shows an ultrasonic transponder XMIT 1 which transmits audio waves or pulses 2 in response to an electrical signal. These are received by a single-point microphone REC 3. FIG. 10 shows these pulses transmitted in position 4 and received at position 5. To avoid problems with ambiguity, the transmit pulses, must be spaced in time farther apart than the longest distance of interest to be measured. Alternatively, the receiving microphone REC 3 may be gated. A clock or digital counter is initiated by the transmit pulse. When the leading edge of the received signal is detected, the counter is stopped. The time "tx" can be converted to distance when the velocity of sound in the medium is used as a scale factor. This process is simple if it occurs in one plane, if point receivers and transmitters are used and there are no reflections. An additional measurement to determine relative motion between the transmitter and the receiver can be made using the Doppler effect. The Doppler effect is determined by measuring the frequency of the received pulses and comparing this frequency to the frequency of the transmitted pulses. The change in frequency between the transmitted pulse and the received pulse is a measure of the velocity of the transmitter relative to the receiver, and is a factor in determining the velocities of the transmitter 5 mounted on the playing instrument 7 and the transmitter 6 mounted on the player's body 4.

There are two ways to determine velocity from the invention system: A) change in position divided by time interval between two measurements; and B) the Doppler effect. As the measurement does not have to be precise for game playing, it will be easier to use the Doppler effect. The Doppler effect provides a measurement only of the component of velocity in the direction of a line between the object or transmitter and the sensor. To calculate the total velocity, three sensors in three coordinates are used and the vectors added. For the speed measurements of the system, it may be sufficient to use just the measurement of one coordinate.

The movement of the player transducer 6 and the player instrument transducer 5 shown FIGS. 7 and 8 is in paths of action and directions that are calculated from the progressing frames of positions determined by the coordinates of the transducers 5 and 6. A three dimensional playing area before monitor 25 of FIG. 7 has a base 41-42-43-44 and a top 45-46-47-48 and may be divided into area zones. Also a zone cuing area may be calculated around the animated character or object displayed on the face of the monitor screen 24 or at the projected mid-air position of animated foreshortened perspective actions. Accordingly, the velocity, mid-air position, monitor screen 24 contact position, path of action, direction of path of action, zone position relative to the video monitor, and zone position relative to the displayed animated character are position measurements of the player 4 and playing instrument 7 that are compared to position and schedule data relative to the animation display which is coded in the animation production or supplied by program memory cartridge 26 for access from memory storage RAM 51 of FIG. 1 to generate a sequence of digital commands to direct the animation display. This embodiment of the present invention increases the degree of animated character dramatic sensitivity to the player actions and this creates a sense of reality. Accordingly, if the player approaches the screen, the animated characters may react and run away or attack. A player moving away from the screen may cause animated characters to appear. If the player moves in any direction the animated character may appear to follow. A quick move by the player may frighten the animated characters. Any move by the player may cause a reaction in the animation. The movement of the player into area zones related to the monitor, or related to the animation character and display, may cause a reaction, or schedule of reactions, by the animated character.

The embodiment described extends the scope of game action. Tennis or Ping-Pong games as contemplated in U.S. Pat. No. 4,695,953 are improved by the realistic and more sensitive reactions of the animated character opponent to the player moves, direction, area position, and speed.

While the motion picture display of the present invention has been described as animation, it is understood that live-action motion pictures may be manufactured, produced, shifted by optical printing, retimed and analyzed for the coordinates of the positions of moving objects to parallel the animation production methods of the invention, and thus be operated by the invention apparatus to perform the unique functions herein described. Live-action motion picture frames may ben enlarged and printed on animation size paper; then, moving characters may be cut out, put on animation cells (of clear plastic sheets), placed on animation or photographic backgrounds and photographed on motion picture film according to the animator's exposure sheet to parallel the animation method and production coding process of the invention. Computer generated images may be organized and analyzed to determine the coordinates of moving objects to parallel the invention process.

While the invention has been described with reference to preferred means and embodiments, it is understood by those skilled in the art that other means of position detection, such as a light pen, mouse or joystick various modifications, alternate arrangements, different circuits and apparatus that parallel the animation method and production coding and coordinate matching process of the invention are within the scope of the invention performing the unique functions of the invention. Therefore, animation descriptions, circuits specified, and apparatus specified should not be construed as limiting the scope of the invention.

What is claimed is:

1. An interactive video game system providing repeated switching of multiple tracks of animated action sequences displayed on viewing media before a player and providing interactive dramatics between the animated action sequences and the player, said video system comprising:

first storage means for storing multiple tracks of data representing animated visual image sequences corresponding to playing action in preselected games, said data including coded frames for track switching and rewinding thereof and coded coordinates of animation locations;

video switching means coupled to said storage means for switching said multiple tracks of animation;

first player input means including a playing instrument having a first transducer installed therein for transmitting a first position signal;

second player input means including a second transducer, said second transducer worn by said player during said game action, said second transducer for transmitting a second position signal;

detection means for detecting said first transmitted position signal and generating instrument position signals representative of the coordinates of said playing instrument with respect to a currently displayed visual image and for detecting said second transmitted position signal and generating player position signals representative of the coordinates of said player with respect to the location of said detection means;

processor means coupled to said video switching means and said detection means, said processor means responsive to said instrument position signal and said player position for comparing said instrument position signals to said coded coordinates of a preselected currently displayed visual image location and generating selection signals derived therefrom, said video switching means responsive to said selection signals for selecting and switching to a next successive track of animated visual image sequences for display before said player;

calculating means coupled to said detection means and to said processor means responsive to said transmitted first and second position signals to generate velocity signals indicative of said playing instrument and said player velocity vectors for providing said selection signals based on said velocity vectors in combination with said instrument an said player position signals to effect the selection of said next successive tracks by said player's actions in response to a currently displayed video image sequence; and display means coupled to said video switching means for displaying said selected tracks of animated video image sequences.

2. An interactive video game system as in claim 1 wherein said processor means is responsive to said player position signal for determining said player position within area zones defined with respect to said display means and said currently displayed video image within an area before said display means and for generating portions of said selection signals as a function of said player position within said area zones.

3. An interactive video game system providing repeated switching of multiple tracks of animated action sequences displayed on viewing media before a player and providing interactive dramatics between the animated action sequences and the player, said video system comprising:

first storage means for storing multiple tracks of data representing animated visual image sequence corresponding to playing action in preselected games, said data including coded frames for track switching and rewinding thereof and coded coordinates of animation locations;

video switching means coupled to said storage means for switching said multiple tracks of animation;

first player input means including a playing instrument having a first transducer installed therein for transmitting a first position signal;

second player input means including a second transducer, said second transducer worn by said player during said game action, said second transducer for transmitting a second position signal;

detection means for detecting said first transmitted position signal and generating instrument position signals representative of the coordinates of said playing instrument with respect to a currently displayed visual image and for detecting said second transmitted position signal and generating player position signals representative of the coordinates of said player with respect to the location of said detection means;

processor means coupled to said video switching means and said detection means, said processor means responsive to said instrument position signal and said player position signal for comparing said instrument position signals to said coded coordinates of a preselected currently displayed visual image location and generating selection signals derived therefrom, said video switching means responsive to said selection signals for selecting and switching to a next successive track of animated visual image sequences for display before said player;

said playing instrument including a rifle, said rifle having a pair of transducers installed therein, one disposed at the distal end of the barrel and the other disposed approximate the end of the barrel adjacent the rifle stock, said processor means including claculator means coupled to said detection means and responsive to said transmitted position signals for calculating the respective locations of said transducers and the intersection point of a line projecting through both said pair of transducers with said video display with respect to said currently displayed video image; and display means coupled to said video switching means for displaying said selected tracks of animated video image sequences.

4. An interactive video game system as in claim 3 wherein said rifle includes a recoil spring, said recoil spring trigger to simulate rifle recoil when said player operates the rifle trigger mechanism.

5. An interactive video game system providing repeated switching of multiple tracks of animated action sequence displayed on viewing media before a player and providing interactive dramatics between the animated action sequences and the player, said video system comprising:

first storage means for storing multiple tracks of data representing animated visual image sequences corresponding to playing action in preselected games, said data including coded frames for track switching and rewinding thereof and coded coordinates of animation locations;

video switching means coupled to said storage means for switching said multiple tracks of animation;

first player input means including a playing instrument having a first transducer installed therein for transmitting a first position signal;

second player input means including a second transducer, said second transducer worn by said player during said game action, said second transducer for transmitting a second position signal;

detection means for detecting said first transmitted position signal and generating instrument position signals representative of the coordinates of said playing instrument with respect to a currently displayed visual image and for detecting said second transmitted position signal and generating player position signals representative of the coordinates of said player with respect to the location of said detection means;

processor means coupled to said video switching means and said detection means, said processor means responsive to said instrument position signal and said player position signal for comparing said instrument position signals to said coded coordinates of a preselected currently displayed visual image location and generating selection signals derived therefrom, said video switching means responsive to said selection signals for selecting and switching to a next successive track of animated visual image sequences for display before said player;

display means coupled to said video switching means for displaying said selected tracks of animated video image sequences;

stereographic projection means including:

multiple tracks of stored data representing a left field of view and a right field of view of said animated visual image sequences;

said display means including means for displaying said left and right fields of view as distinguishable displays; and filter means coupling to said display means for displaying said left field of view to said player's left eye and said right field of view to said player's right eye.

6. An interactive video game system as in claim 5 wherein said filter means includes cyclic shutter means for alternatingly viewing said left field of view with said left eye and viewing said right field of view with said right eye, said shutter means cycled at a selectable rate.

7. An interactive video game system providing repeated switching of multiple tracks of animated action sequences displayed on viewing media before a player and providing interactive dramatics between the animated action sequences and the player, said video system comprising:

first storage means for storing multiple tracks of data representing animated visual image sequences corresponding to playing action in preselected games, said data including coded frames for track switching and rewinding thereof and coded coordinates of animation locations;

video switching means coupled to said storage means for switching said multiple tracks of animation;

first player input means including a playing instrument having a first transducer installed therein for transmitting a first position signal;

second player input means including a second transducer, said second transducer worn by said player during said game action, said second transducer for transmitting a second position signal;

detection means for detecting said first transmitted position signal and generating instrument position signals representative of the coordinates of said playing instrument with respect to a currently displayed visual image and for detecting said second transmitted position signal and generating player position signals representative of the coordinates of said player with respect to the location of said detection means;

processor means coupled to said video switching means and said detection means, said processor means responsive to said instrument position signal and said player position signal for comparing said instrument position signals to said coded coordinates of a preselected currently displayed visual image location and generating selection signals derived therefrom, said video switching means responsive to said selection signals for selecting and switching to a next successive track of animated visual image sequences for display before said player;

said multiple tracks of data including multiple tracks of data representing visual image sequences of live action; and display means coupled to said video switching means for displaying said selected tracks of animated video image sequences.

* * * * *